United States Patent [19]

Mengel

[11] 4,159,466
[45] Jun. 26, 1979

[54] BURGLAR ALARM SYSTEM

[75] Inventor: William H. Mengel, Brighton, Mich.

[73] Assignee: Troyonics, Inc., Troy, Ohio

[21] Appl. No.: 821,139

[22] Filed: Aug. 2, 1977

[30] Foreign Application Priority Data

Aug. 3, 1976 [GB] United Kingdom ............... 32188/76

[51] Int. Cl.² ............................................. B60R 25/10
[52] U.S. Cl. ................................. 340/63; 307/10 AT; 340/545
[58] Field of Search ............... 340/63, 64, 274 R, 276, 340/541, 545; 307/10 AT; 180/114

[56] References Cited

U.S. PATENT DOCUMENTS

| | | | |
|---|---|---|---|
| 3,829,829 | 8/1974 | Teich | 340/64 |
| 4,012,732 | 3/1977 | Herrick | 340/279 |
| 4,016,537 | 4/1977 | Ray | 340/64 |

Primary Examiner—John W. Caldwell, Sr.
Assistant Examiner—Joseph E. Nowicki
Attorney, Agent, or Firm—Jacox & Meckstroth

[57] ABSTRACT

A motor vehicle alarm system incorporates five integrated circuits mounted on a printed circuit board enclosed within a case. The integrated circuits include a high speed oscillator as a clock source, a twelve stage binary counter, a set of flip-flops used as memories, a three input AND gate, and a flip-flop used as the start or stop memory for the clock source. The alarm system becomes armed approximately four minutes and fifteen seconds after the ignition key is turned off. If a door is then opened, the alarm will be actuated unless the ignition switch is turned on within fifteen seconds.

7 Claims, 1 Drawing Figure

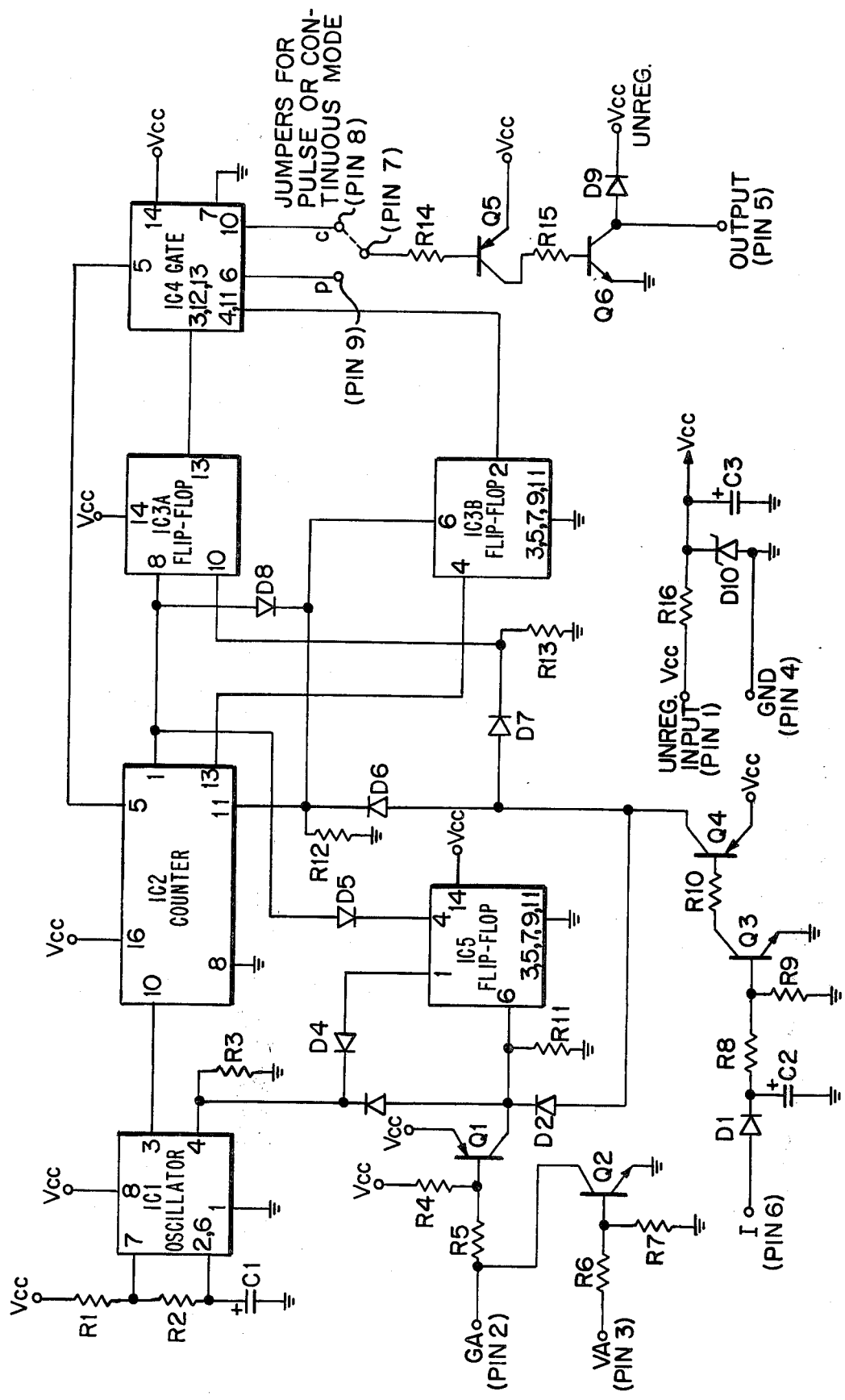

BURGLAR ALARM SYSTEM

SUMMARY OF THE INVENTION

The invention is directed to an improved burglar alarm system adapted for installation within a motor vehicle such as an automobile or truck which operates on a 12 volt electrical system and has one or more courtesy or dome lights operated by door actuated switches. The alarm system incorporates solid state electronic components including five integrated circuits which are mounted on a printed circuit board. The components and the PC board are enclosed within a flat case of molded plastics material, and six lead wires extend from the circuit board, are identified as "Vcc," "GA," "VA," "Ground," "Output," and "I."

When the alarm system is installed in a motor vehicle, preferably near the fuse box, lead wire "Vcc" is connected to a continuous twelve volt power supply such as available at the fuse for the cigarette lighter. Either lead wire "GA" is connected to the door actuated switches which control the courtesy light or lead wire "VA" is connected to the switches, depending on the particular electrical circuitry of the vehicle as to whether the door switch goes to ground or to voltage when a switch is closed in response to opening a door. The "Ground" lead wire is connected to the chassis of the vehicle, and the "Output" lead wire is connected to the input of a relay for the horn or other alarm unit on the vehicle. The "I" lead wire is connected to the twelve volt source which is controlled by the ignition switch and is supplied when the switch is on.

After installed, the alarm system is self-arming and operates automatically. The alarm system becomes armed approximately four minutes and fifteen seconds after the ignition key is turned off. If a door is opened after the alarm system is armed, the alarm will be actuated unless the ignition switch is turned on within fifteen seconds after the door is opened. In one form, the alarm is provided by pulsating the horn at intervals of one second. The alarm is turned off by turning the key ignition switch on and can not be turned off during a four minute period simply by closing the door.

BRIEF DESCRIPTION OF THE DRAWING

FIG. 1 is a schematic electrical diagram of an alarm system constructed in accordance with the invention.

DESCRIPTION OF THE PREFERRED EMBODIMENT

The alarm control system is described in reference to the schematic electrical diagram shown in FIG. 1. The identification of the components shown in FIG. 1 is set forth at the end of this description.

The alarm control system includes five basic integrated circuits which are identified on the drawing as IC1 through IC5. IC1 is basically used as a high speed oscillator to provide a timer or clock source. IC2 is a twelve stage binary counter from which is picked off predetermined time periods. Output pin 3 of IC1 is connected to input 10 of IC2. Resistors R1 and R2 and tantalum capacitor C1 connect with pins 7, 2 and 6 of IC1 to provide a time constant. This determines the frequency of oscillation which is on the order of eight to ten pulses per second.

IC3 includes both IC3A and IC3B which are flip-flops and are used as memories. IC3B is actuated after a count of fifteen seconds from pin 13 of IC2, and IC3A is actuated after a count of approximately four minutes and fifteen seconds from pin 1 of IC2. IC4 is used as a gate and is basically a three input AND gate which receives a one second output from pin 5 of IC2, the output of the four minute fifteen second memory from IC3A and the output of the fifteen second memory from IC3B. When all three outputs are received, the output of IC4 actuates the alarm signal such as the motor vehicle horn, as will be explained later. The control of the alarm depends upon whether the pulse output pin 6 or the continuous output pin 10 of IC4 is connected to control the output transistors Q5 and Q6 through R14.

IC5 is a flip-flop and is the stop or start memory for the clock IC1. It is the same as is IC3 but only one section of it is used. The purpose of IC5 will be explained later. As mentioned above, the alarm control output GA corresponds to "ground for alarm," and output VA corresponds to "voltage for alarm." Output I is connected to the ignition switch of the vehicle. These three outputs determine when the alarm is going to work and how it is going to work. When output GA is connected to ground, PNP transistor Q1 will conduct since a negative or ground potential is placed on the base of Q1. The collector of Q1 will then go to the emitter potential, and a positive input voltage is supplied to pin 6 of IC5.

A voltage on pin 6 of IC5 turns IC5 on, and pin 1 goes to a positive voltage which is supplied through diode D4 to pin 4 of IC1. This turns clock IC1 on, and the clock will stay on so that pulses are supplied to pin 10 of IC2. After fifteen seconds of pulses, pin 13 of IC2 gets an output which sets IC3B, the fifteen second memory. A pulse of approximately one pulse per second is supplied to IC4 from pin 5 of IC2. However, the pulse may be from 0.9 second to 1.1 seconds, depending upon the tolerance of IC2. As mentioned above, after four minutes and fifteen seconds of clock pulses from IC1, a positive output from pin 1 of IC2 turns on flip-flop IC3A which enables one of the input gates of IC4.

At the same time IC3A is set, the fifteen second flip-flop IC3B is reset through diode D8 which also resets IC2 through pin 11. A pulse from pin 1 of IC2 also resets IC5 through diode D5 and turns off the clock or IC1. The system is then in an alarm condition. The only way to turn on IC5 is through inputs GA or VA or I, the ignition. By putting a voltage to input VA, NPN transistor Q2 is turned on by a positive voltage on its base which causes Q2 to conduct. The collector will go to the emitter which is connected to the GA input or to ground. This does the same thing as applying ground to the GA input. Thus either GA or VA may be used to control the alarm system, depending on the electrical circuitry of the vehicle. For example, when you open up the doors on some cars, the switch goes to a positive voltage, but on other cars, the switch goes to ground.

When the ignition switch of a car is turned on, input I receives twelve volts. The twelve volt input on I goes through diode D1 and causes NPN transistor Q3 to conduct due to a positive voltage on its base with its collector at ground. The voltage goes through resistor R10 to the base of PNP transistor Q4, and a ground potential on the base of Q4 causes transistor Q4 to conduct the positive voltage Vcc of twelve volts.

The positive voltage from the collector of Q4 goes several places. First it goes to diode D6 to reset IC2 through pin 11. IC2 is held in a reset condition as long as there is a positive voltage on pin 11 and will not count out. Even though the clock IC1 is operating, the counters of IC2 will not operate as long as there is positive voltage on input pin 11. This insures that while the ignition is on, and a voltage is supplied to input I, nothing happens. The positive voltage from the collector of Q4 is also supplied to diode D7 for resetting the four minute memory flip-flop IC3A through pin 10.

There is another path from the collector of Q4 through diode D2 to input pin 6 of IC5. This keeps the start-stop flip-flop IC5 in a ready condition. Since diode D3 is also in series with diode D2, a positive voltage is supplied to pin 4 of IC1. Thus when the ignition is on, the clock IC1 is running. However, when the ignition is on, the positive voltage conducted through transistor Q3, Q4 and diode D6, holds the counters of IC2 off and keeps the flip-flop IC3A reset, but everything is triggered and ready to go.

When the ignition is turned off, there is no longer twelve volts on the ignition I input, and thus transistors Q3 and Q4 cease to conduct. The positive voltage is also removed from diode D2 and through diode D3 to the clock flip-flop IC1. However, since the start-stop flip-flop IC5 was triggered and ready to go, the clock IC1 is kept running when the ignition is off by a voltage from the output pin 1 of IC5 through diode D4 to pin 4 of IC1. Since the positive voltage going to pin 11 of IC2 is also removed, IC2 is triggered and the clock pulses are counted through IC2. Thus every second, pin 5 gets a one second output, and after fifteen seconds IC3B is triggered through pin 13 of IC2. After four minutes and fifteen seconds, IC3A is triggered through pin 1 of IC2. When IC3A is triggered, IC3B and IC2 are reset, and the clock IC1 is stopped. At this point, the alarm is armed.

There are also three other terminals involved within the alarm system. One terminal is the common ground which is connected to either the car chassis or the negative terminal of the twelve volt battery supply. All of the common grounds shown in FIG. 1 connect together and terminate at pin 4 on a printed circuit board (not shown). Another terminal is Vcc which is a positive continuous twelve volts from the battery. This continuous twelve volt power supply goes through resistor R16 and Zener diode D10 and capacitor C3. The purpose of R16, D10 and C3 is to remove and filter out any spikes within the system and also to remove any AC components and ground loops which may exist. Vcc is supplied to all of the integrated circuits and to the other terminals marked Vcc on FIG. 1 of the drawings.

The sixth terminal in FIG. 1 is labeled "O" for output and connects the collector of transistor Q6 to the alarm or horn relay. When the collector goes to ground, the alarm or horn is actuated since the horn relay goes to ground. In some autos, nothing happens when the horn relay is grounded because it takes a positive voltage to actuate the horn relay. When the horn relay requires a positive voltage to actuate the horn or in those autos that do not have a horn relay, an external horn relay is used along with the alarm system.

The alarm has the capabilities of supplying either a continuous output or a pulsed output, and pins 7, 8 and 9 on the printed circuit board provide this flexibility. Pin 7 is the common. If a continuous output is desired, such as for a siren, a jumper is placed from pin 7 to pin 8. If a pulsed output is desired, the jumper is placed from pin 7 to pin 9.

One of the important features of an alarm system constructed in accordance with the invention is provided by using the high speed oscillator IC1 with the binary counter IC2 from which predetermined time periods are used. That is, the solid state components do not have to be hand picked or carefully graded. Instead, commercially available and less expensive components, with average tolerances, can be used in production, and the time periods of approximately fifteen seconds and four minutes and fifteen seconds will be substantially the same from one alarm control unit to the next. Thus there is no sacrifice in accuracy and reliability of the alarm control units when less expensive components are used.

The identification of the components shown in FIG. 1 is set forth on following page 8.

| Resistors | Ohms | Power | Resistors | Ohms | Power |
|---|---|---|---|---|---|
| R1 | 5.6K | ¼ Watt - 10% | R9 | 2.2K | ¼ Watt - 10% |
| R2 | 15K | " | R10 | 22K | " |
| R3 | 820 | " | R11 | 8.2K | " |
| R4 | 2.2K | " | R12 | 8.2K | " |
| R5 | 22K | " | R13 | 8.2K | " |
| R6 | 22K | " | R14 | 1K | " |
| R7 | 2.2K | " | R15 | 1K | " |
| R8 | 15K | " | R16 | 68 | ½ Watt - 10% |
| Transistor | Identification | | | | |
| Q1 | MPS 3638 | | | | |
| Q2 | MPS 5172 | | | | |
| Q3 | MPA 5172 | | | | |
| Q4 | MPS 3638 | | | | |
| Q5 | MPS 2628 | | | | |
| Q6 | MJE 521 (4 amp) or 2N 6121 | | | | |
| Diode | Identification | | | | |
| D1 through D8 | IN 4154 or IN 4148 or IN 914 | | | | |
| D9 | IN 4001 | | | | |
| D10 | IN 758 or IN 961 (10v. 500 mw) | | | | |
| Capacitor | Identification | | | | |
| C1 | 4.7/35V Sprague 196D475X9035JAI (Tantalum) | | | | |
| C2 | 5/16V Sprague TE 1152 or equivalent | | | | |
| C3 | 100/16V Sprague TE 1162 or equivalent | | | | |
| Integrated Circuit | Identification | | | | |
| IC1 | NE 555 | | | | |
| IC2 | CD 4040 | | | | |
| IC3 | CD 4013 | | | | |
| IC4 | CD 4023 | | | | |
| IC5 | CD 4013 | | | | |

While the form of alarm system herein described constitutes a preferred embodiment of the invention, it is to be understood that the invention is not limited to this precise form of alarm system, and that changes may be made therein without departing from the scope and spirit of the invention as defined in the appended claims.

The invention having thus been described, the following is claimed:

1. An electronic burglar alarm control system adapted for use on a motor vehicle having a main control switch and a door responsive switch, said system comprising clock means for generating electrical pulses at a predetermined frequency, means for counting said pulses and for producing a plurality of electrical pulse time outputs corresponding to at least three different frequencies, memory means for storing the time outputs of at least two different frequencies, means for controlling the operation of said clock means in response to one of the stored time outputs and actuation of the door responsive switch, means for controlling the operation of said counting means in response to operation of the control switch, and gate means for sensing a predetermined pulse output from said counting means and a predetermined output from said memory means and for actuating an alarm in response to a predetermined state of said counting and memory means.

2. An alarm control system as defined in claim 1 wherein said three different frequency outputs of said counting means comprise a first time output at a frequency corresponding to the desired pulse actuation of the alarm, a second time output at a frequency corresponding to a desired delay period for arming the control system after the control switch is turned off, and a third time output at a frequency corresponding to a desired delay period for actuating the alarm after the door responsive switch is actuated.

3. An alarm control system as defined in claim 2 wherein said memory means is effective to store said second and third time outputs, and means for resetting said memory means in response to actuation of said control switch.

4. An alarm control system as defined in claim 1 wherein said gate means comprise an AND gate which receives one time output from said counting means and two different time outputs from said memory means, and the alarm is actuated in pulses corresponding to said one time output.

5. An alarm control system as defined in claim 1 including means for selecting between a continuous mode and a pulsed mode of operation for the alarm.

6. An alarm control system as defined in claim 1 wherein one of said time outputs from said counting means corresponds to a desired delay period for arming the control system after the control switch is turned off, and said means for controlling the operation of said clock means comprises memory means controlling the operation of said clock means in response to said one time output.

7. An electronic system for controlling the actuation of an electrically operated alarm in response to manual actuation of switch means, said system comprising clock means for generating electrical pulses at a predetermined frequency, means for counting said pulses in response to actuation of said switch means and for producing a first pulse output corresponding to the desired pulse actuation of the alarm and a second pulse output corresponding to a desired delay period for arming the control system after actuation of the switch means and a third pulse output corresponding to a desired delay period for actuating the alarm after actuation of the switch means, memory means for storing the second and third pulse outputs and for controlling the operation of said clock and counting means, and gate means for sensing a predetermined pulse output from said counting means and a predetermined output from said memory means and for actuating the alarm in response to a predetermined state of said counting and memory means.

* * * * *